United States Patent
Goredema et al.

(10) Patent No.: US 8,968,452 B2
(45) Date of Patent: *Mar. 3, 2015

(54) **PHASE CHANGE INKS CONTAINING CRYSTALLINE *TRANS*-CINNAMIC DIESTERS AND AMORPHOUS ISOSORBIDE OLIGOMERS**

(75) Inventors: Adela Goredema, Mississauga (CA); Rina Carlini, Oakville (CA); Caroline M. Turek, Mississauga (CA); Guerino G. Sacripante, Oakville (CA); Edward G. Zwartz, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 285 days.

This patent is subject to a terminal disclaimer.

(21) Appl. No.: 13/196,227

(22) Filed: Aug. 2, 2011

(65) Prior Publication Data
US 2013/0032056 A1 Feb. 7, 2013

(51) Int. Cl.
*C09D 11/02* (2014.01)
*C09D 11/14* (2006.01)
*C09D 11/34* (2014.01)
*C09D 11/38* (2014.01)

(52) U.S. Cl.
CPC ............... *C09D 11/14* (2013.01); *C09D 11/34* (2013.01); *C09D 11/38* (2013.01)
USPC ..................................... 106/31.29; 106/31.13

(58) Field of Classification Search
None
See application file for complete search history.

(56) References Cited

U.S. PATENT DOCUMENTS 5,173,113 A * 12/1992 Sugerman et al. ......... 106/31.35
2012/0092426 A1 * 4/2012 Chopra et al. .................. 347/88

OTHER PUBLICATIONS

U.S. Appl. No. 13/095,636, filed Apr. 27, 2011, Belelie et al.
Rina Carlini et al., U.S. Appl. No. 13/095,174.
Rina Carlini et al., U.S. Appl. No. 13/095,221.
Kentaro Morimitsu et al., U.S. Appl. No. 13/095,795.
Paul McConville et al., U.S. Appl. No. 13/095,038.
Naveen Chopra et al., U.S. Appl. No. 13/095,555.
Jennifer L. Belelie et al., U.S. Appl. No. 13/095,591.
Kentaro Morimitsu et al., U.S. Appl. No. 13/095,784.
Kentaro Morimitsu et al., U.S. Appl. No. 13/095,715.
Kentaro Morimitsu et al., U.S. Appl. No. 13/095,770.
Jennifer L. Belelie et al., U.S. Appl. No. 13/095,681.
Thomas Edward Enright et al., U.S. Appl. No. 13/095,015.
Kentaro Morimitsu et al., U.S. Appl. No. 13/095,028.
Rina Carlini et al., U.S. Application No.

* cited by examiner

*Primary Examiner* — Yun Qian
(74) *Attorney, Agent, or Firm* — MDIP LLC

(57) ABSTRACT

Disclosed is a phase change ink comprising: (a) a crystalline trans-cinnamic diester; and (b) an amorphous oligomer of isosorbide and a diacid.

20 Claims, No Drawings

PHASE CHANGE INKS CONTAINING CRYSTALLINE *TRANS*-CINNAMIC DIESTERS AND AMORPHOUS ISOSORBIDE OLIGOMERS

CROSS-REFERENCE TO RELATED APPLICATIONS

Reference is made to U.S. application Ser. No. 13/095,174, filed Apr. 27, 2011, entitled "Ink Compositions Incorporating Substituted Oxazoline Compounds or Substituted Oxazoline Derivatives," with the named inventors Rina Carlini, Guerino G. Sacripante, Stephan V. Drappel, and Charles Geoffrey Allen, the disclosure of which is totally incorporated herein by reference.

Reference is made to U.S. application Ser. No. 13/095,221, filed Apr. 27, 2011, entitled "Substituted Oxazoline Compounds or Substituted Oxazoline Derivatives," with the named inventors Rina Carlini, Guerino G. Sacripante, Stephan V. Drappel, and Bo Wu, the disclosure of which is totally incorporated herein by reference.

Reference is made to U.S. application Ser. No. 13/095,795, filed Apr. 27, 2011, entitled "Solid Ink Compositions Comprising Amorphous Esters of Citric Acid," with the named inventors Kentaro Morimitsu, Jennifer L. Belelie, Stephan V. Drappel, C. Geoffrey Allen, Corey Tracy, and Peter G. Odell, the disclosure of which is totally incorporated herein by reference.

Reference is made to U.S. application Ser. No. 13/095,038, filed Apr. 27, 2011, entitled "Print Process for Phase Separation Ink," with the named inventors Paul McConville, Joanne L. Lee, Peter G. Odell, and Sandra J. Gardner, the disclosure of which is totally incorporated herein by reference.

Reference is made to U.S. application Ser. No. 13/095,555, filed Apr. 27, 2011, entitled "Phase Change Inks and Methods of Making the Same," with the named inventors Naveen Chopra, Jennifer L. Belelie, Kentaro Morimitsu, Stephan V. Drappel, Corey Tracy, and Peter G. Odell, the disclosure of which is totally incorporated herein by reference.

Reference is made to U.S. application Ser. No. 13/095,591, filed Apr. 27, 2011, entitled "Phase Change Ink Components and Methods of Making the Same," with the named inventors Jennifer L. Belelie, Kentaro Morimitsu, Naveen Chopra, Corey Tracy, Stephan V. Drappel, and Peter G. Odell, the disclosure of which is totally incorporated herein by reference.

Reference is made to U.S. application Ser. No. 13/095,784, filed Apr. 27, 2011, entitled "Solid Ink Compositions Comprising Amorphous Esters of Tartaric Acid," with the named inventors Kentaro Morimitsu, Jennifer L. Belelie, Naveen Chopra, Stephan V. Drappel, Corey Tracy, and Peter G. Odell, the disclosure of which is totally incorporated herein by reference.

Reference is made to U.S. application Ser. No. 13/095,715, filed Apr. 27, 2011, entitled "Solid Ink Compositions Comprising Crystalline Esters of Tartaric Acid," with the named inventors Kentaro Morimitsu, Jennifer L. Belelie, Naveen Chopra, Stephan V. Drappel, Corey Tracy, and Peter G. Odell, the disclosure of which is totally incorporated herein by reference.

Reference is made to U.S. application Ser. No. 13/095,770, filed Apr. 27, 2011, entitled "Phase Change Inks and Methods of Making the Same," with the named inventors Kentaro Morimitsu, Jennifer L. Belelie, Naveen Chopra, Stephan V. Drappel, Corey Tracy, and Peter G. Odell, the disclosure of which is totally incorporated herein by reference.

Reference is made to U.S. application Ser. No. 13/095,681, filed Apr. 27, 2011, entitled "Solid Ink Compositions Comprising Crystalline-Amorphous Mixtures," with the named inventors Jennifer L. Belelie, Peter G. Odell, Stephan V. Drappel, Kentaro Morimitsu, Naveen Chopra, Corey Tracy, Jule W. Thomas Jr., Jeffrey H. Banning, Paul J. McConville, and Joanne L. Lee, the disclosure of which is totally incorporated herein by reference.

Reference is made to U.S. application Ser. No. 13/095,015, filed Apr. 27, 2011, entitled "Solventless Reaction Process," with the named inventors Thomas Edward Enright, Pouneh Salehi, and Kentaro Morimitsu, the disclosure of which is totally incorporated herein by reference.

Reference is made to U.S. application Ser. No. 13/095,028, filed Apr. 27, 2011, entitled "Phase Change Ink," with the named inventors Kentaro Morimitsu, Jennifer L. Belelie, Naveen Chopra, Stephan V. Drappel, Corey L. Tracy, and Peter G. Odell, the disclosure of which is totally incorporated herein by reference.

Reference is made to U.S. application No. (not yet assigned; Attorney Docket No. 20101648-US-NP), filed concurrently herewith, entitled "Phase Change Inks Containing Oxazoline Compounds and Polyterpene Resins," with the named inventors Rina Carlini, Adela Goredema, Guerino G. Sacripante, Caroline M. Turek, and Edward G. Zwartz, the disclosure of which is totally incorporated herein by reference.

Reference is made to U.S. application No. (not yet assigned; Attorney Docket No. 20101550-US-NP), filed concurrently herewith, entitled "Solid Phase Change Ink Compositions Comprising Oxazolines," with the named inventors Rina Carlini, Adela Goredema, Guerino G. Sacripante, Caroline M. Turek, and Edward G. Zwartz, the disclosure of which is totally incorporated herein by reference.

BACKGROUND

Disclosed herein are phase change ink compositions. More specifically, disclosed herein are phase change inks containing crystalline trans-cinnamic acid derived diesters and amorphous oligomers of isosorbide and various diacids.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Known phase change inks generally contain components such as crystalline waxes and other materials that enable sharp and rapid phase transitions from the molten liquid state to the solid state. Many known phase change inks, however, exhibit disadvantages such as poor adhesion to coated paper substrates, resulting in poor scratch-resistance, poor image robustness, hard and brittle properties, poor 'paper fold' performance such as cracking and creasing of the image when the document is folded, and document offset. Further, the nonpolarity of these ink components often leads to compatibility issues with commonly available dyes and pigments, resulting in the need for more expensive or custom-designed colorants to ensure good solubility or dispersibility in the ink carrier and good long-term thermal stability to prevent colorant degradation or colorant migration. Additionally, many known phase change inks generate prints that do not accept writing from pens.

Customers have also created a demand for materials that are bio-based, or derived at least partly from renewable resources. Energy and environmental policies, increasing and volatile oil prices, and public/political awareness of the rapid depletion of global fossil reserves has created a need to find sustainable monomers derived from biomaterials. By using bio-renewable feedstock, manufacturers can reduce their carbon footprint and move to a zero-carbon or even a carbon-neutral footprint. Bio-based polymers are also very attractive in terms of specific energy and emission savings. Using bio-based feedstock can decrease the amount of plastic targeted for landfills, help provide new sources of income for domestic agriculture, and reduce the economic risks and uncertainty associated with reliance on petroleum imported from unstable regions.

Accordingly, while known materials and processes are suitable for their intended purposes, there is a need for improved phase change inks. In addition, there is a need for phase change inks that exhibit sharp and rapid phase transitions from the molten liquid state to the solid state. Further, there is a need for phase change inks that exhibit good adhesion to coated paper substrates. Additionally, there is a need for phase change inks that exhibit good scratch-resistance. There is also a need for phase change inks that exhibit good image robustness. In addition, there is a need for phase change inks that exhibit good "paper fold" performance and reduced cracking and creasing of the image when the document is folded. Further, there is a need for phase change inks that exhibit good document offset performance. Additionally, there is a need for phase change inks that exhibit good compatibility with commonly available colorants. In addition, a need remains for phase change inks that contain at least some materials at least partly derived from bio-based or renewable resources. Further, a need remains for phase change inks that can be prepared at desirably low cost. Additionally, a need remains for phase change inks that generate prints which accept writing from pens. There is also a need for phase change inks that contain some biodegradable components.

SUMMARY

Disclosed herein is a phase change ink comprising: (a) a crystalline trans-cinnamic diester; and (b) an amorphous oligomer of isosorbide and a diacid. Also disclosed herein is a phase change ink comprising: (1) an ink carrier comprising: (a) a crystalline trans-cinnamic diester in an amount of from about 65 to about 95 percent by weight of the ink carrier; and (b) an amorphous oligomer of isosorbide and a diacid in an amount of from about 5 to about 35 percent by weight of the ink carrier; and (2) a colorant. Further disclosed herein is a phase change ink comprising: (1) an ink carrier comprising: (a) a crystalline trans-cinnamic diester of the formula

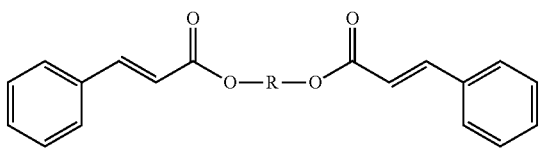

wherein R is: (i) an alkylene group, including substituted and unsubstituted alkylene groups, and wherein hetero atoms either may or may not be present in the alkylene group; (ii) an arylene group, including substituted and unsubstituted arylene groups, and wherein hetero atoms either may or may not be present in the arylene group; (iii) an arylalkylene group, including substituted and unsubstituted arylalkylene groups, and wherein hetero atoms either may or may not be present in either or both of the alkyl portion and the aryl portion of the arylalkylene group; or (iv) an alkylarylene group, including substituted and unsubstituted alkylarylene groups, and wherein hetero atoms either may or may not be present in either or both of the alkyl portion and the aryl portion of the alkylarylene group; wherein two or more substituents can be joined together to form a ring; and (b) an amorphous oligomer of isosorbide and a diacid of the formula

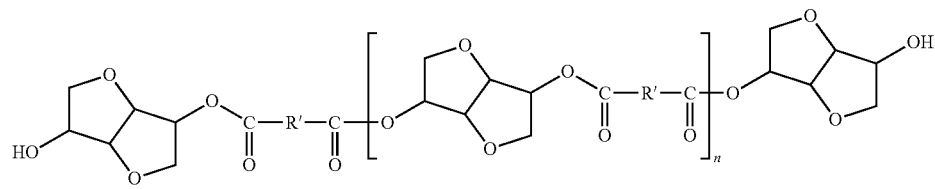

wherein R' is: (i) an alkylene group, including substituted and unsubstituted alkylene groups, and wherein hetero atoms either may or may not be present in the alkylene group; (ii) an arylene group, including substituted and unsubstituted arylene groups, and wherein hetero atoms either may or may not be present in the arylene group; (iii) an arylalkylene group, including substituted and unsubstituted arylalkylene groups, and wherein hetero atoms either may or may not be present in either or both of the alkyl portion and the aryl portion of the arylalkylene group; or (iv) an alkylarylene group, including substituted and unsubstituted alkylarylene groups, and wherein hetero atoms either may or may not be present in either or both of the alkyl portion and the aryl portion of the alkylarylene group; wherein two or more substituents can be joined together to form a ring; and wherein n is from about 2 to about 10; and (2) a colorant.

DETAILED DESCRIPTION

Ink Components

The inks disclosed herein contain a crystalline trans-cinnamic acid derived diester. Trans-cinnamic acid is a natural material found in oil of cinnamon, or in balsams such as storax or shea butter. Trans-cinnamic acid can also be derived from the natural amino-acid phenylalanine using the enzyme phenyalanine ammonia-lyase. Different diols of the formula HO—R—OH can be reacted with trans-cinnamic acid to give di-esters.

Examples of suitable trans-cinnamic diesters include (but are not limited to) those of the formula

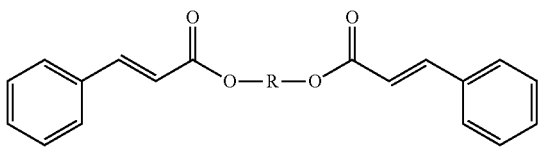

wherein R is (1) an alkylene group, including linear, branched, saturated, unsaturated, cyclic, substituted, and unsubstituted alkylene groups, and wherein hetero atoms, such as oxygen, nitrogen, sulfur, silicon, phosphorus, boron, and the like either may or may not be present in the alkylene group, in one embodiment with at least about 2 carbon atoms, in another embodiment with at least about 3 carbon atoms, and in yet another embodiment with at least about 4 carbon atoms, and in one embodiment with no more than about 20 carbon atoms, in another embodiment with no more than about 10 carbon atoms, and in yet another embodiment with no more than about 8 carbon atoms, although the number of carbon atoms can be outside of these ranges, (2) an arylene group, including substituted and unsubstituted arylene groups, and wherein hetero atoms, such as oxygen, nitrogen, sulfur, silicon, phosphorus, boron, and the like either may or may not be present in the arylene group, in one embodiment with at least about 6 carbon atoms, in another embodiment with at least about 7 carbon atoms, and in yet another embodiment with at least about 8 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as phenylene or the like, (3) an arylalkylene group, including substituted and unsubstituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkylene group, in one embodiment with at least about 7 carbon atoms, in another embodiment with at least about 8 carbon atoms, and in yet another embodiment with at least about 9 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as benzylene or the like, or (4) an alkylarylene group, including substituted and unsubstituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylarylene group, in one embodiment with at least about 7 carbon atoms, in another embodiment with at least about 8 carbon atoms, and in yet another embodiment with at least about 9 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as tolylene or the like, and wherein the substituents on the substituents on the substituted alkylene, arylene, arylalkylene, and alkylarylene groups can be (but are not limited to) hydroxy groups, halogen atoms, ammonium groups, pyridine groups, pyridinium groups, ether groups, aldehyde groups, ketone groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, isothiocyanato groups, carboxylate groups, carboxylic acid groups, urethane groups, urea groups, mixtures thereof, and the like, wherein two or more substituents can be joined together to form a ring.

Specific examples of suitable trans-cinnamic acid derived diesters include (but are not limited to) propane-1,3-trans-cinnamate, of the formula

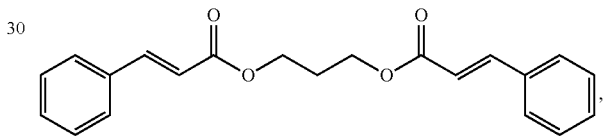

butane-1,4-trans-cinnamate, of the formula

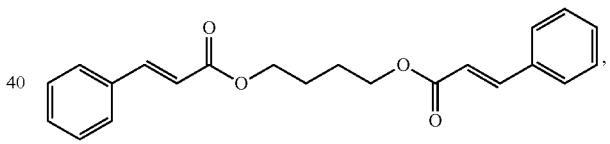

hexane-1,6-trans-cinnamate, of the formula

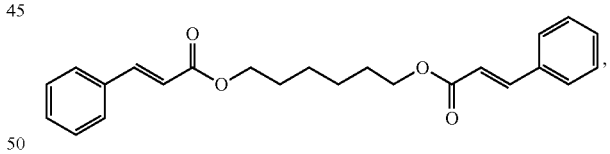

trans-cyclohexane-1,4-diemthanol-trans-cinnamate, of the formula

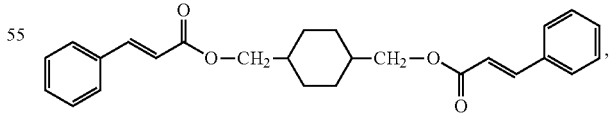

para-phenyl 1,4-dimethanol-trans-cinnamate, of the formula

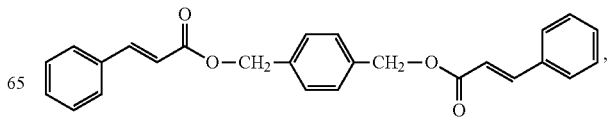

bis(hydroxymethyl)furan-trans-cinnamate, of the formula

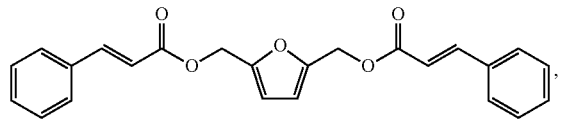 [SMILES: O=C(/C=C/c1ccccc1)OCc1ccc(COC(=O)/C=C/c2ccccc2)o1]

2,5-dihydroxymethyl-tetrahydrofuran-trans-cinnamate, of the formula

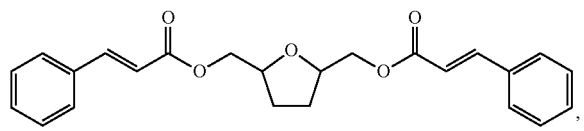 [SMILES: O=C(/C=C/c1ccccc1)OCC1CCC(COC(=O)/C=C/c2ccccc2)O1]

and the like, as well as mixtures thereof.

In one specific embodiment, the diol is selected to be derived from a bio-based or renewable resource. Products can be tested for whether they are sourced from petroleum or from renewable resources by $^{14}C$ radiocarbon dating. Products sourced from petroleum will have substantially high $^{14}C$ radiocarbon dating values, in the millions of years, compared to very recent or present day radiocarbon values for those products derived from renewable resources. Examples of suitable bio-based diols include, but are not limited to, 1,4-butanediol, 1,3-propadediol, and the like, which can be obtained from sugars. In this manner, the entire trans-cinnamic diester material can be selected to be bio-based, or "green".

The trans-cinnamic diester is present in the ink carrier in any desired or effective amount, in one embodiment at least about 65 percent by weight, in another embodiment at least about 70 percent by weight, and in yet another embodiment at least about 75 percent by weight, and in one embodiment no more than about 95 percent by weight, in another embodiment no more than about 90 percent by weight, and in yet another embodiment no more than about 85 percent by weight, although the amount can be outside of these ranges.

The inks disclosed herein also contain an amorphous oligomer of isosorbide and a diacid. Isosorbide, which is a natural material derived from plant sugars and starch, such as corn and wheat, of the formula

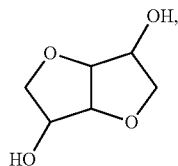

reacts with diacids of the formula HOOC—R'—COOH to form oligomers of the formula suitable for including in the inks disclosed herein, wherein n is an integer of in one embodiment at least about 2, and in another embodiment at least about 3, and in one embodiment no more than about 10, and in another embodiment no more than about 8, although the value of n can be outside of these ranges, and R' is (1) an alkylene group, including linear, branched, saturated, unsaturated, cyclic, substituted, and unsubstituted alkylene groups, and wherein hetero atoms, such as oxygen, nitrogen, sulfur, silicon, phosphorus, boron, and the like either may or may not be present in the alkylene group, in one embodiment with at least about 2 carbon atoms, and in one embodiment with no more than about 10 carbon atoms, although the number of carbon atoms can be outside of these ranges, (2) an arylene group, including substituted and unsubstituted arylene groups, and wherein hetero atoms, such as oxygen, nitrogen, sulfur, silicon, phosphorus, boron, and the like either may or may not be present in the arylene group, in one embodiment with at least about 6 carbon atoms, in another embodiment with at least about 7 carbon atoms, and in yet another embodiment with at least about 8 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as phenylene or the like, (3) an arylalkylene group, including substituted and unsubstituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the arylalkylene group, in one embodiment with at least about 7 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as benzylene or the like, or (4) an alkylarylene group, including substituted and unsubstituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, boron, and the like either may or may not be present in either or both of the alkyl portion and the aryl portion of the alkylarylene group, in one embodiment with at least about 7 carbon atoms, and in one embodiment with no more than about 20 carbon atoms, in another embodiment with no more than about 18 carbon atoms, and in yet another embodiment with no more than about 16 carbon atoms, although the number of carbon atoms can be outside of these ranges, such as tolylene or the like, and wherein the substituents on the substituents on the substituted alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups,

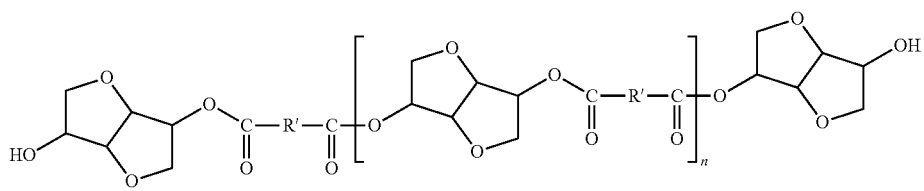

aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

Specific examples of suitable isosorbide oligomers include those with itaconic acid, wherein R' is

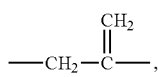

succinic acid, wherein R' is —CH$_2$CH$_2$—, tartaric acid, wherein R' is

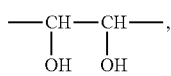

and the like, as well as mixtures thereof.

In one specific embodiment, the diacid is selected to be derived from a bio-based or renewable resource. Examples of suitable bio-based diacids include, but are not limited to, succinic acid, itaconic acid, azelaic acid, and the like, which are derived from agricultural and forestry sources. In this manner, the entire isosorbide oligomer material can be selected to be bio-based, or "green".

The oligomer of isosorbide is present in the ink carrier in any desired or effective amount, in one embodiment at least about 5 percent by weight, in another embodiment at least about 10 percent by weight, and in yet another embodiment at least about 15 percent by weight, and in one embodiment no more than about 35 percent by weight, in another embodiment no more than about 30 percent by weight, and in yet another embodiment no more than about 28 percent by weight, although the amount can be outside of these ranges.

Additional optional components can be contained in the ink carrier, such as viscosity modifiers, for example sorbitan tristearate esters such as SPAN 65, available from Croda, in the ink carrier in amounts of in one embodiment at least about 0.5 percent by weight, in another embodiment at least about 1 percent by weight, and in yet another embodiment at least about 1.5 percent by weight, and in one embodiment no more than about 15 percent by weight, in another embodiment no more than about 10 percent by weight, and in yet another embodiment no more than about 8 percent by weight, although the amount can be outside of these ranges.

The ink carrier is present in the phase change ink in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

By careful selection of the sources of the ink carrier contents sources, the ink carrier can have a high bio-renewable content (BRC). Isosorbide is 100% BRC, and many of the acids with which it can be reacted to form oligomers, such as succinic, itaconic, and azelaic acid, are 100% BRC. Trans-cinnamic acid is potentially a 100% BRC material if a BRC source for it can be identified. Currently trans-cinnamic acid is produced via a synthetic process. There are attempts to make it from natural amino acid phenylalanine. If that process succeeds, it will be a source for bio-renewable trans-cinnamic acid. Many diols with which it forms esters, such as 1,4-butanediol, 1,3-propadediol, and 2,3-butanediol are obtained from sugars and accordingly are 100% BRC; accordingly these materials are 100% BRC. Accordingly, in one embodiment, the ink carrier (defined as that portion of the ink other than the colorant and other minor additives such as antioxidants and the like) has a BRC of at least about 10%, in another embodiment at least about 20%, and in yet another embodiment at least about 30%, although the amount can be outside of these ranges.

In addition, both the crystalline trans-cinnamic diester and the amorphous oligomer of isosorbide are esters, which are a class of materials known to be readily biodegradable, further enhancing the "green" properties of the ink disclosed herein.

Colorants

The ink compositions also contain a colorant. Colorants can include dyes, pigments, mixtures thereof, and the like. The carrier compositions can be used in combination with colorant materials such as Color Index (C.I.) Solvent Dyes, Disperse Dyes, modified Acid and Direct Dyes, Basic Dyes, Sulfur Dyes, Vat Dyes, and the like. Examples of suitable dyes include Neozapon Red 492 (BASF); Orasol Red G (BASF); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (BASF); Orasol Black RLP (BASF); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (BASF); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 from Crompton and Knowles, C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), Orasol Blue GN, Solvent Blue 101 (Keytone), Solvent Blue 36, metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (BASF); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (BASF); Orasol Black RLP (BASF); Savinyl Black RLS (Clariant); Morfast Black Conc. A (Rohm and Haas); Orasol Blue GN (BASF); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

Examples of suitable pigments include, but are not limited to, PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PACO C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (BASF); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow DI 355, DI 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

Other ink colors besides the subtractive primary colors can be desirable for applications such as postal marking, industrial marking, and labelling using phase change printing, and the inks are applicable to these needs. Further, infrared (IR) or ultraviolet (UV) absorbing dyes can also be incorporated into the inks for use in applications such as "invisible" coding or marking of products. Examples of such infrared and ultraviolet absorbing dyes are disclosed in, for example, U.S. Pat. Nos. 5,378,574; 5,146,087; 5,145,518; 5,543,177; 5,225,900; 5,301,044; 5,286,286; 5,275,647, 5,208,630; 5,202,265; 5,271,764; 5,256,193; 5,385,803, and 5,554,480, the disclosures of each of which are totally incorporated herein by reference.

The colorant is present in any desired or effective amount to obtain the desired color or hue, in one embodiment at least about 0.1 percent by weight of the ink, and in another embodiment at least about 0.2 percent by weight of the ink, and in one embodiment no more than about 15 percent by weight of the ink, and in another embodiment no more than about 8 percent by weight of the ink, although the amount can be outside of these ranges.

Additional Ink Additives

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 445, NAUGUARD® 76, and NAUGUARD® 512 (commercially available from Uniroyal Chemical Company, Oxford, Conn.), IRGANOX® 1010 (commercially available from BASF), and the like. When present, the optional antioxidant is present in the ink in any desired or effective amount, in one embodiment of at least about 0.01 percent by weight of the ink, in another embodiment of at least about 0.05 percent by weight of the ink, in yet another embodiment of at least about 0.1 percent by weight of the ink, and in yet still another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

Ink Preparation

The ink compositions can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

Ink Properties

The ink compositions in one embodiment have peak melting points of no lower than about 65° C., in another embodiment of no lower than about 66° C., and in yet another embodiment of no lower than about 67° C., and have melting points in one embodiment of no higher than about 150° C., in another embodiment of no higher than about 140° C., and in yet another embodiment of no higher than about 130° C., although the peak melting point can be outside of these ranges.

The ink compositions in one embodiment have peak crystallization points of no lower than about 65° C., in another embodiment of no lower than about 66° C., and in yet another embodiment of no lower than about 67° C., and have melting points in one embodiment of no higher than about 150° C., in another embodiment of no higher than about 140° C., and in yet another embodiment of no higher than about 130° C., although the peak crystallization point can be outside of these ranges.

Melting point and crystallization can be measured using a Q1000 Differential Scanning calorimeter (TA Instruments) at a rate of 10° C./min from −50° C. to 200° C. to −50° C. using midpoint values.

The ink compositions generally have melt viscosities at the jetting temperature (in one embodiment no lower than about 75° C., in another embodiment no lower than about 85° C., and in yet another embodiment no lower than about 95° C., and in one embodiment no higher than about 150° C., and in another embodiment no higher than about 140° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges. In another specific embodiment, the inks have viscosities of from about 7 to about 15 centipoise at temperatures of about 120, 130, and/or 140° C.

The inks disclosed herein have hardness values, measured at about 25° C. using a PTC® Durometer Model PS 6400-0-29001, available from Pacific Transducer Corp., Los Angeles, Calif. using a Model 476 Stand with standard 1 Kg load, of in one embodiment at least about 65, in another embodiment at least about 68, and in yet another embodiment at least about 70, although the value can be outside of these ranges.

Printing Processes

In specific embodiments, the solid ink compositions can be employed in apparatus for direct printing ink jet processes, wherein droplets of the melted ink are ejected in an imagewise pattern onto a recording substrate and the recording substrate is a final recording substrate, such as direct to paper applications, although the substrate is not limited to paper. The substrate can be any suitable material such as paper, boxboard, cardboard, fabric, transparency, plastic, glass, wood, or the like. A direct printing process is also disclosed in, for example, U.S. Pat. No. 5,195,430, the disclosure of which is totally incorporated herein by reference.

Alternatively, the inks can be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate. An offset or indirect printing process is disclosed in, for example, U.S. Pat. No. 5,389,958, the disclosure of which is totally incorporated herein by reference.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, Xerox Digital Color Elite Gloss (DCEG), Xerox DURAPAPER, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments. All parts and percentages are by weight unless otherwise indicated. In the examples below, melting temperatures were measured as temperatures increased and crystallization temperatures were measured as temperatures decreased and the midpoint values were reported. Temperatures measured by DSC were measured with a Q1000 DSC from TA instruments at a rate of 10° C./min from −20° C. to 150° C. to −20° C. Temperatures measured by rheology were measured with a RFS3 controlled strain Rheometer (TA Instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz. Molecular weights were measured via gel permeation chromatography on a Waters 2690 Separation Module.

EXAMPLE I

Synthesis of Butane-1,4-Trans-Cinnamate

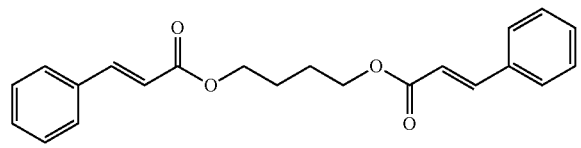 [SMILES: O=C(/C=C/c1ccccc1)OCCCCOC(=O)/C=C/c1ccccc1]

To a 3-neck 500 mL round-bottomed flask equipped with a dean stark trap and condenser, thermocouple, and argon inlet was added trans-cinnamic acid (100 g, 674 mmol, obtained from Sigma-Aldrich), 1,4-butanediol (30.4 g, 337 mmol, obtained from Sigma-Aldrich), and FASCAT 4201 dibutyl tin oxide catalyst (0.12 g, 0.1 wt %, obtained from Arkema Inc.). The mixture was slowly heated under argon to 120° C., during which time the trans-cinnamic acid melted. The temperature was then raised to 180° C., and condensation began around 150° C. The reaction mixture was stirred at 180° C. overnight (~20 h). Thereafter, vacuum (1-2 mm-Hg) was applied for ~20 min. A total of 5.3 mL water was collected in the dean stark trap. The reaction mixture was cooled under argon to ~100° C. and discharged into an aluminum tray and cooled to room temperature to give 110 g of product as an off-white solid. The product was transferred to a 500 mL Erlenmeyer flask, to which was added ~125 mL isopropyl alcohol heated to ~85° C., during which the product dissolved. The flask was then cooled to room temperature, during which product crystallized out, was filtered, and dried in a vacuum oven at 60° C. overnight to give 90 g product as an off-white solid (79% yield). The product was shown to be pure by NMR. $T_{melt}$(DSC)=93° C.; $T_{cryst}$(DSC)=72° C.; $T_{cryst}$(rheology)=87° C.

EXAMPLE II

Synthesis of Propane-1,3-Trans-Cinnamate

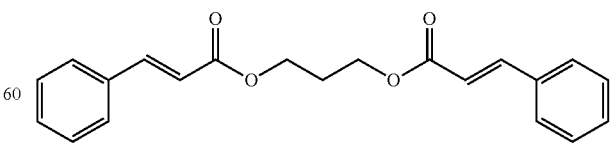

The process of Example I was repeated except that 1,3-propanediol was used instead of 1,4-propanediol. $T_{melt}$(DSC)=89.9° C.; $T_{cryst}$(DSC)=72° C. (measured with DSC at 5° C./minute.

EXAMPLE III

Synthesis of Isosorbide/Succinic Acid Oligomer

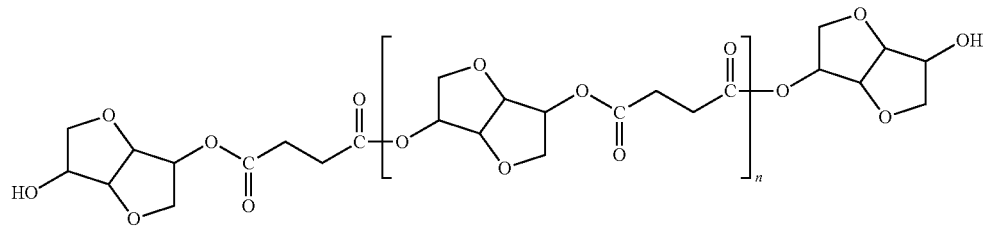

To a 1-neck 500 mL round-bottomed flask equipped with a dean stark trap and a condenser was added isosorbide (27.61 g, 189 mmol, obtained from Archer Daniels Midland, Ill.), succinic acid (10.63 g, 90 mmol, obtained from Sigma-Aldrich), p-toluenesulfonic acid (0.17 g, 0.90 mmol, obtained from Sigma-Aldrich), and toluene (200 mL). The reaction mixture was heated (setpoint 125° C.), during which the toluene started refluxing. The mixture was allowed to reflux overnight (about 22 h) during which about 3 mL water was collected in the dean stark trap. The reaction mixture was cooled to room temperature and the product settled at the bottom of the flask as a brownish residue. The toluene was decanted, after which the product was dissolved in dichloromethane (300 mL) and washed with saturated $NaHCO_3$ (2×200 mL), followed by washing with water (1×200 mL). The solution was dried with $MgSO_4$, rotovapped to remove solvent, and dried on a vacuum pump overnight to give an off-white fluffy solid. The product was further dried in a vacuum oven (∫200 mm-Hg at 120° C.) overnight. The product was cooled to room temperature to give a glassy material (15 g). Tg(DSC)=35° C.; viscosity @130° C.=516 cps; viscosity @65° C.=1.3×10$^6$ cps. Mn(GPC)=1045; Mw(GPC)=1204; Polydispersity (Pd) (GPC)=1.15.

EXAMPLE IV

Synthesis of Isosorbide/Succinic Acid Oligomer

To a 1 L Parr reactor equipped with a double turbine agitator and distillation apparatus was charged 483.3 g isosorbide, 186.2 g succinic acid, and 2.0 g VERTEC AC422 catalyst (organic titanate obtained from Johnson Matthey, Tex.). The contents were heated to 180° C. over 3 h and allowed to stir for an additional 4 h; the temperature was then raised to 195° C. and the reaction mixture was allowed to stir overnight, during which 35 g water were collected. The pressure was then reduced to 200 mm-Hg for ~1 h, after which the temperature was raised to 200° C. and the pressure was reduced to ~1-2 mm-Hg for 1 h. The mixture was stirred for ~2 hours at 200° C. under nitrogen and reduced pressure (1-2 mm-Hg) for an additional 1 h, after which the mixture was cooled under nitrogen and discharged into an aluminum pan at 120° C. During the reaction a total of 55 g of water was collected. NMR indicated the presence of residual isosorbide. About 150 g of the product was then added to a 1 L Erlenmeyer flask, dissolved in dichloromethane (~300 mL), and washed with saturated $NaHCO_3$ (2×200 mL) followed by washing with water (1×200 mL). The solution was dried with $MgSO_4$, rotovapped to remove solvent, and dried on a vacuum pump overnight to give an off-white fluffy solid. The product was further dried in a vacuum oven (~200 mm-Hg at 120° C.) overnight. The product was cooled to room temperature to give a glassy material (70 g). Tg(DSC)=33° C.; viscosity @130° C.=439 cps; viscosity @65° C.=1.7×10$^6$ cps. Mn(GPC)=1078; Mw(GPC)=1276; Pd(GPC)=1.18.

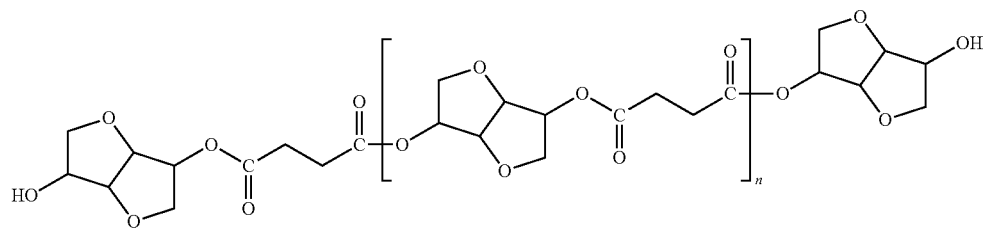

EXAMPLE V

Synthesis of Isosorbide/Itaconic Acid Oligomer

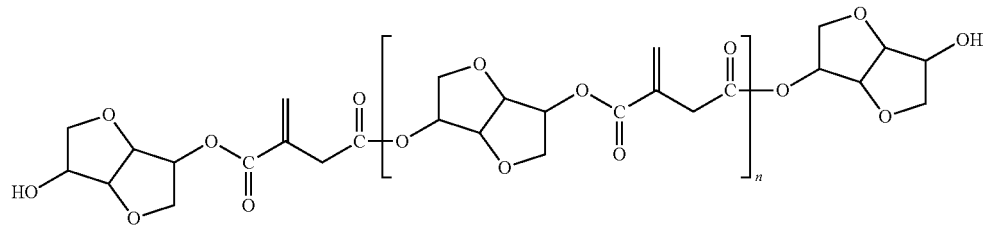

To a 3-neck 250 mL round-bottomed flask equipped with a dean stark trap and a condenser was added isosorbide (40.0 g, 273.9 mmol, obtained from Archer Daniels, Midland, Ill.), itaconic acid (32.39 g, 248.9 mmol, obtained from Sigma-Aldrich), and FASCAT 4201 dibutyl tin oxide catalyst (0.07 g, 0.1 wt %, obtained from Arkema Inc.). The mixture was slowly heated under argon to 120° C., during which time the reagents melted. The temperature was then raised to 180° C., and condensation began around 150° C. The reaction mixture was stirred at 180° C. overnight (~20 h). Thereafter, vacuum (1-2 mm-Hg) was applied for ~30 min. A total of 3.0 mL water was collected in the dean stark trap. The reaction mixture was cooled under argon to ~100° C. and discharged into an aluminum tray and cooled to room temperature to give 65 g of product as a glassy material. Tg(DSC)=19.5° C.; viscosity @130° C.=769 cps; viscosity @70° C.=6.63×10$^5$ cps. Mn(GPC)=689; Mw(GPC)=1245; Pd(GPC)=1.80.

EXAMPLE VI

Synthesis of Isosorbide/Malic Acid Oliqomer

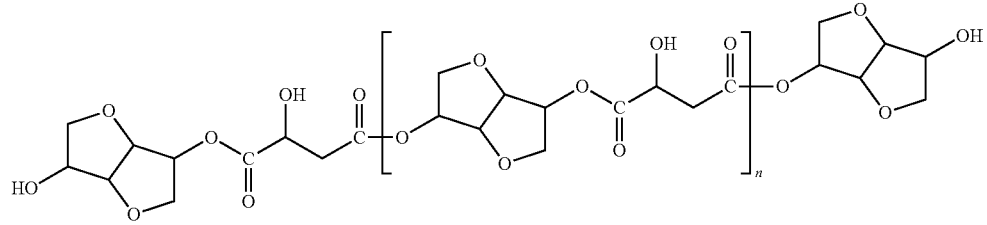

To a 3-neck 250 mL round-bottomed flask equipped with a dean stark trap and a condenser was added isosorbide (40.0 g, 273.9 mmol, obtained from Archer Daniels), malic acid (30.60 g, 228.22 mmol, obtained from Sigma-Aldrich), and FASCAT 4201 dibutyl tin oxide catalyst (0.07 g, 0.1 wt %, obtained from Arkema Inc.). The mixture was slowly heated under argon to 120° C., during which time the reagents melted. The temperature was then raised to 180° C., and condensation began around 150° C. The reaction mixture was stirred at 180° C. overnight (~20 h). A total of 3.0 mL water was collected in the dean stark trap. The reaction mixture was cooled under argon to ~100° C. and discharged into an aluminum tray and cooled to room temperature to give 63 g of product as a glassy material. Tg(DSC)=23.2° C.; viscosity @130° C.=1019 cps; viscosity @70° C.=8.08×10$^5$ cps. Mn(GPC)=567; Mw(GPC)=868; Pd(GPC)=1.53.

EXAMPLE VII

Preparation of Ink A

Into a 30 mL glass vessel was charged, in the following order: 3.9 g butane 1,4-trans-cinnamate (78 wt. %, prepared as described in Example I) and 0.98 g isosorbide/succinic acid oligomer (19.5 wt. %, prepared as described in Example III). The materials were melted at 130° C. for 1 h, after which was added 0.13 g (2.5 wt. %) ORASOL BLUE GN dye as colorant, obtained from Ciba (now BASF) to the molten mixture. The colored ink mixture was heated at 130° C. while stirring at 300 rpm for an additional 2.5 h. The dark blue molten ink was then poured into a mold and cooled at room temperature to solidify. Viscosity at 130° C.=12.14 cps; viscosity at 80° C. (peak viscosity)=5.4×10$^7$ cps; T$_{cryst}$(rheology)=81° C.

EXAMPLE VIII

Preparation of Ink B

The process of Example VII was repeated except that the ingredients were as follows: 1,4-trans-cinnamate (72 wt. %, prepared as described in Example I); isosorbide/succinic acid oligomer (20 wt. %, prepared as described in Example III); sorbitan tristearate ester viscosity modifier (5.5 wt. %, SPAN 65, obtained from Croda); 2.5 wt. %) ORASOL BLUE GN dye. Viscosity at 130° C.=11.09 cps; viscosity at 65° C. (peak viscosity)=8.2×10$^7$ cps; T$_{cryst}$(rheology)=69° C.

EXAMPLE IX

Preparation of Ink C

The process of Example V was repeated except that the ingredients were as follows: 1,4-trans-cinnamate (75 wt. %, prepared as described in Example I); isosorbide/succinic acid oligomer (20 wt. %, prepared as described in Example IV); sorbitan tristearate ester viscosity modifier (2.5 wt. %, SPAN 65); 2.5 wt. %) ORASOL BLUE GN dye. Viscosity at 130° C.=10.89 cps; viscosity at 74° C. (peak viscosity)=7.8×10$^7$ cps; T$_{cryst}$(rheology)=75° C.

Rheology Profiles

The complex viscosity of Inks A, B, and C over a temperature range of 65 to 130° C. is given in the table below:

| Temperature (° C.) | Ink A (cps) | Ink B (cps) | Ink C (cps) |
|---|---|---|---|
| 130 | 12.14 | 11.09 | 10.89 |
| 80 | 5.42 × 10$^7$ | 66.73 | 79.35 |
| 75 | >10$^7$ | 83.63 | 4.66 × 10$^5$ |
| 73 | >10$^7$ | — | 8.36 × 10$^7$ |
| 65 | >10$^7$ | 8.32 × 10$^7$ | >10$^7$ |

Ink Hardness Evaluation

Ink hardness was measured by pouring each ink into a brass mold to prepare a disk sample ~5 mm thick. The ink hardness was evaluated by needle penetrometer test (using a Durometer instrument) where the needle tip impacted the surface of the ink disk at a 90° incident angle (normal to the ink disk surface), wherein a value of 100% hardness indicates an impenetrable surface (hard metal, glass, etc.). The results were as follows:

| Ink A | Ink B | Ink C |
|---|---|---|
| Top of Ink Disk | | |
| 91.2 | 79.6 | 86.1 |
| Bottom of Ink Disk | | |
| 86.4 | 78.2 | 79.0 |

Print Generation and Evaluation

Each ink sample was printed onto Xerox Digital Color Elite Gloss coated papers (120 gsm stock) using a K-proofer gravure printing plate rigged with a pressure roll set at low pressure. The gravure plate temperature controller was set at 142° C., but the actual plate temperature was ~134° C.

Image robustness of the K-proofed ink prints was evaluated using a "coin" scratch test and gouge scratch. The test looked at how much ink was removed from the coating after a "coin" tool with a beveled edge was run across the surface. For this test a modified Taber Industries Linear Abraser (Model 5700) with a custom "coin" scratch tip was used. The scratch attachment (mass of the "coin" holder, scratch tip, mounting) was 100 g and was lowered onto the test sample, which was then scratched for either 3 cycles or 9 cycles with a frequency of 25 cycles/minute. A two inch long scratch was examined to see what damage had occurred to the print. The amount of material removed from the coated paper was then measured by first scanning along the scratch length (flat bed scanner) and then using image analysis software to count the area of paper visible relative to the original amount of ink in the scratched area.

Inks A, B, and C did not show any significant ink removal when scratched using the instrument. This performance was superior to that of many commercially available solid phase change inks.

Attempts to write on the K-proofed prints with a PAPER-MATE ballpoint pen resulted in good reception of the ink images by the prints, which is not usually observed with images made by solid phase change inks.

It is believed that incorporation of Inks A, B, and C into a modified XEROX® PHASER 8860 printer will result in the generation of prints onto Digital Color Elite Gloss, 120 gsm (DCEG) and Xerox Business 4200 (75 gsm) papers, forming robust images that cannot be easily removed from the substrates.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink comprising:
   (a) a crystalline trans-cinnamic diester; and
   (b) an amorphous oligomer of isosorbide and a diacid.

2. The ink according to claim 1 further comprising a colorant.

3. The ink according to claim 2 wherein the colorant is a pigment.

4. The ink according to claim 2 wherein the colorant is a dye.

5. The ink according to claim 1 wherein the trans-cinnamic diester is of the formula

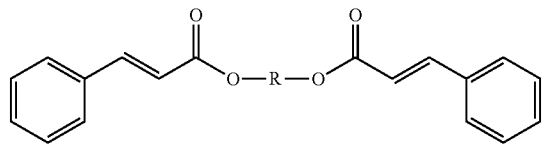

wherein R is:
   (a) an alkylene group, including substituted and unsubstituted alkylene groups, with hetero atoms optionally present in the alkylene group;
   (b) an arylene group, including substituted and unsubstituted arylene groups, with hetero atoms optionally present in the arylene group;
   (c) an arylalkylene group, including substituted and unsubstituted arylalkylene groups, with hetero atoms optionally present in either or both of the alkyl portion and the aryl portion of the arylalkylene group; or
   (d) an alkylarylene group, including substituted and unsubstituted alkylarylene groups, with hetero atoms optionally present in either or both of the alkyl portion and the aryl portion of the alkylarylene group;
   with two or more substituents optionally joined together to form a ring.

6. The ink according to claim 1 wherein the trans-cinnamic diester is propane-1,3-trans-cinnamate, butane-1,4-trans-cinnamate, hexane-1,6-trans-cinnamate, trans-cyclohexane-1,4-diemthanol-trans-cinnamate, para-phenyl 1,4-dimethanol-trans-cinnamate, bis(hydroxymethyl)furan-trans-cinnamate, 2,5-dihydroxymethyl-tetrahydrofuran-trans-cinnamate, or a mixture thereof.

7. The ink according to claim 1 wherein the trans-cinnamic diester is present in the ink in an amount of from 65 to 95 percent by weight of the ink.

8. The ink according to claim 1 wherein the oligomer of isosorbide is present in the ink in an amount of from 5 to 35 percent by weight of the ink.

9. The ink according to claim 1 further containing a viscosity modifier.

10. The ink according to claim 1 wherein the ink carrier has a bio-renewable content of at least 10%.

11. The ink according to claim 1 having a hardness value of at least 70.

12. The ink according to claim 1 having a crystallization temperature, as measured by differential scanning calorimetry, of from 65 to 150° C.

13. A phase change ink comprising:
    (a) a crystalline trans-cinnamic diester; and
    (b) an amorphous oligomer of isosorbide and a diacid, wherein the oligomer of isosorbide is of the formula

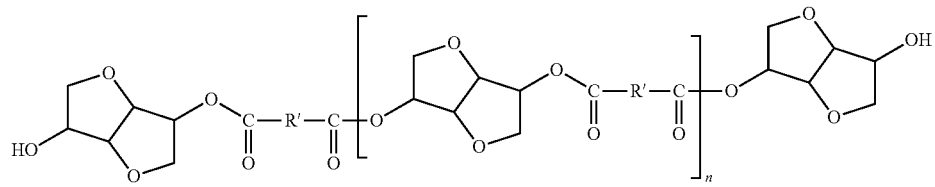

wherein R' is:
   (a) an alkylene group, including substituted and unsubstituted alkylene groups, with hetero atoms optionally present in the alkylene group;
   (b) an arylene group, including substituted and unsubstituted arylene groups, with hetero atoms optionally present in the arylene group;
   (c) an arylalkylene group, including substituted and unsubstituted arylalkylene groups, with hetero atoms optionally present in either or both of the alkyl portion and the aryl portion of the arylalkylene group; or
   (d) an alkylarylene group, including substituted and unsubstituted alkylarylene groups, with hetero atoms optionally present in either or both of the alkyl portion and the aryl portion of the alkylarylene group;
   with two or more substituents optionally joined together to form a ring;
   and wherein n is from 2 to 10.

14. The ink according to claim 13 wherein the oligomer of isosorbide is an isosorbide-succinic acid oligomer, an isosorbide-itaconic acid oligomer, an isosorbide-tartaric acid oligomer, an isosorbide-malic acid oligomer, or a mixture thereof.

15. A phase change ink comprising:
    (a) a crystalline trans-cinnamic diester; and
    (b) an amorphous oligomer of isosorbide and a diacid, further containing a sorbitan tristearate ester viscosity modifier.

16. A phase change ink comprising:
    (1) an ink carrier comprising:
       (a) a crystalline trans-cinnamic diester in an amount of from 65 to 95 percent by weight of the ink carrier; and
       (b) an amorphous oligomer of isosorbide and a diacid in an amount of from 5 to 35 percent by weight of the ink carrier; and
    (2) a colorant.

17. The ink according to claim 16 wherein the colorant is a pigment.

18. The ink according to claim 16 wherein the colorant is a dye.

19. A phase change ink comprising:
    (1) an ink carrier comprising:
       (a) a crystalline trans-cinnamic diester of the formula

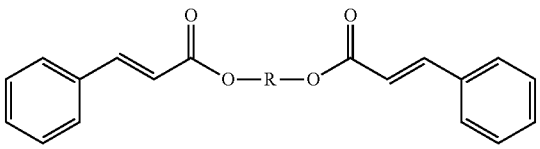

wherein R is:
   (i) an alkylene group, including substituted and unsubstituted alkylene groups, with hetero atoms optionally present in the alkylene group;
   (ii) an arylene group, including substituted and unsubstituted arylene groups, with hetero atoms optionally present in the arylene group;
   (iii) an arylalkylene group, including substituted and unsubstituted arylalkylene groups, with hetero atoms optionally present in either or both of the alkyl portion and the aryl portion of the arylalkylene group; or
   (iv) an alkylarylene group, including substituted and unsubstituted alkylarylene groups, with hetero atoms optionally present in either or both of the alkyl portion and the aryl portion of the alkylarylene group;
   with two or more substituents optionally joined together to form a ring;
   and (b) an amorphous oligomer of isosorbide and a diacid of the formula

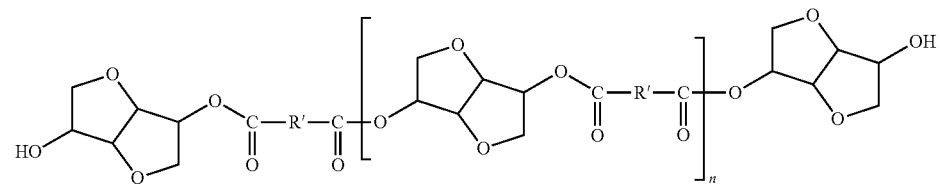

wherein R' is: (i) an alkylene group, including substituted and unsubstituted alkylene groups, with hetero atoms optionally present in the alkylene group;

(ii) an arylene group, including substituted and unsubstituted arylene groups, with hetero atoms optionally present in the arylene group;

(iii) an arylalkylene group, including substituted and unsubstituted arylalkylene groups, with hetero atoms optionally present in either or both of the alkyl portion and the aryl portion of the arylalkylene group; or (iv) an alkylarylene group, including substituted and unsubstituted alkylarylene groups, with hetero atoms optionally present in either or both of the alkyl portion and the aryl portion of the alkylarylene group; with two or more substituents optionally joined together to form a ring; and wherein n is from 2 to 10; and (2} a colorant.

20. The ink according to claim 19 wherein the ink carrier further contains a viscosity modifier which is a sorbitan tristearate ester.

* * * * *